Figure 4:
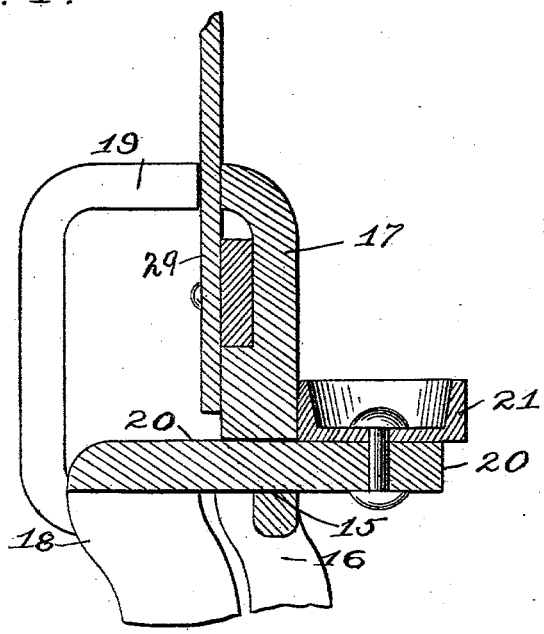

No. 629,798. Patented Aug. 1, 1899.
J. MACPHAIL.
SICKLE GRINDER.
(Application filed Oct. 3, 1898.)
(No Model.) 2 Sheets—Sheet 1.
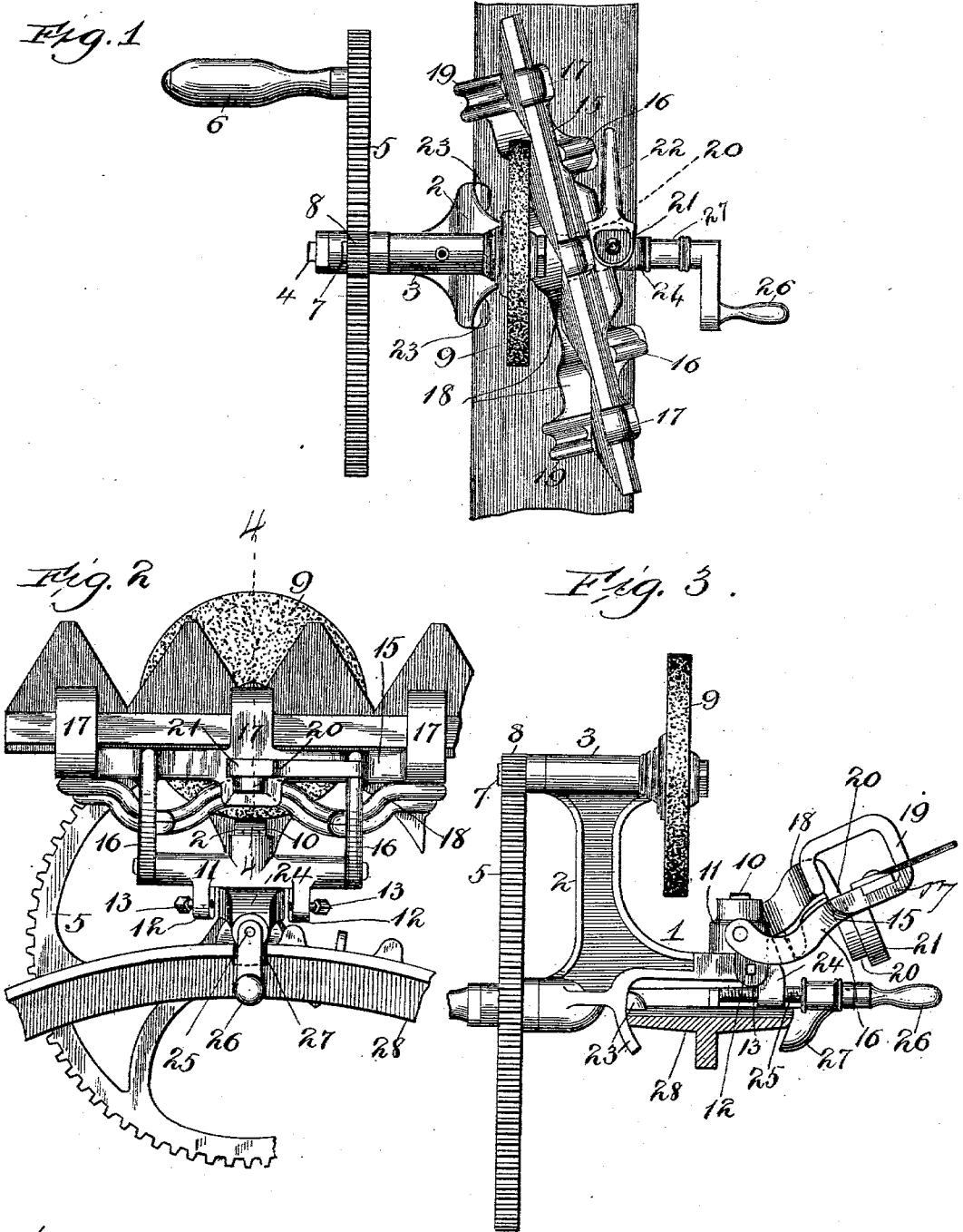
Witnesses:
Inventor:
James Macphail
By Coburn, Hibben & McElroy
Attys.

No. 629,798. Patented Aug. 1, 1899.
J. MACPHAIL.
SICKLE GRINDER.
(Application filed Oct. 3, 1898.)
(No Model.) 2 Sheets—Sheet 2.

UNITED STATES PATENT OFFICE.

JAMES MACPHAIL, OF BLUE ISLAND, ILLINOIS, ASSIGNOR TO THE PLANO MANUFACTURING COMPANY, OF CHICAGO, ILLINOIS.

SICKLE-GRINDER.

SPECIFICATION forming part of Letters Patent No. 629,798, dated August 1, 1899.

Application filed October 3, 1898. Serial No. 692,490. (No model.)

*To all whom it may concern:*

Be it known that I, JAMES MACPHAIL, a citizen of the United States, residing at Blue Island, in the county of Cook and State of Illinois, have invented certain new and useful Improvements in Sickle-Grinders, of which the following is a specification.

My invention has relation to sickle-grinders; and its object is to provide a simple and efficient device particularly adapted for the grinding of sickle-sections of harvesters, mowers, and the like.

My sickle-grinder embodies novel and advantageous features of construction and operation, which will be apparent from the description hereinafter given.

In the drawings, Figure 1 is a plan view showing my sickle-grinder attached for convenience to the master or bull wheel of a harvester or mower; Fig. 2, a side elevation thereof; Fig. 3, an end elevation thereof; and Fig. 4, a detail view on line 4 of Fig. 2, showing the means for holding together the two parts of the sickle-bar-supporting frame.

The grinder, as shown, comprises a frame consisting of a base or lower portion 1 and an upright or standard 2, at whose top is formed a journal 3. The frame is provided with a short shaft 4, on which rotates the driving gear-wheel 5, to which is attached any ordinary handle, such as 6. The journal 3 provides a bearing for the shaft 7, which carries at one end a pinion 8, meshing with the driving-wheel 5, and at the other end an emery or sand wheel 9, which I will term for convenience the "grinding-wheel."

Upon the base portion 1 is cast or otherwise formed or arranged a pivot-pin 10, upon which is pivoted a movable base or member 11, having ears or lugs 12 projecting downward on either side of the base portion 1. This member has a limited movement on its pivot-pin, and the amount of this movement is adjustable by means of the screws 13, which adjustment is for a purpose hereinafter apparent.

The means for supporting the sickle-bar (a portion of the bar being shown in the drawings) and for presenting the sickle-bar to the grinding-wheel comprises a frame 15, having arms 16 pivoted to the ends of the member 11, as shown in Figs. 2 and 3. The frame has a series of upwardly-extending projections 17, whose ends are turned inwardly to form a socket to receive the sickle-bar proper. A supplemental angular frame 18 is loosely mounted on the frame 15 and is provided at its ends with curved fingers 19, extending toward and close to the inturned ends of the projections 17. This frame 18 has at its middle portion a lug 20, projecting through the frame 15 and carrying a rotating cam 21, operated by a handle 22 and adapted to contact the side of the frame 15. The object of this construction is to bring the two frames together and to clamp the sickle-bar therebetween.

The under side of the base 1 is provided with a stationary hook portion 23 and with a lug 24, having a screw-threaded hole receiving a screw-threaded rod 25, operated by a handle 26. This rod carries loosely a hook-shaped piece 27, which coöperates with the hook 23 to engage the object or stand to which the grinder is to be attached. In the drawings I have shown it attached to the bull-wheel 28 of a harvester or mower, which is an easy and ready place of attachment; but it will be understood that I do not limit myself to this particular place of and arrangement for attachment of my sickle-grinder.

The operation of my sickle-grinder is as follows: The cam is turned to allow the sickle-bar-supporting frames to open, and the sickle-bar is then inserted and the cam shifted to clamp the sickle-bar therebetween. The object of the adjustment of the movable base 11 by means of the set-screws is to provide for long and short knife-sections, the adjustment being varied according to the length of the knife-section. The frames are adapted to swing up to present the sickle-sections to the grinding-wheel, and one cutting edge of one knife-section will be ground when the frame is turned in one direction and one cutting edge of another knife-section will be ground when the frame is turned in the other direction. When two cutting edges are thus ground, the cam is again operated and the sickle-bar advanced, and so on until the operation is completed.

Although I have described more or less precise forms and details of construction, I do not wish to be understood as limiting myself thereto, as I contemplate changes in form, the proportion of parts, and the substitution of equivalents as circumstances may suggest or render expedient and without departing from the spirit of my invention.

I claim—

1. A sickle-grinder comprising a main frame, a grinding-wheel mounted therein and rotatable in a plane substantially parallel to the sickle-bar presented thereto, means for rotating said wheel, a sickle-bar-supporting frame having a rotating movement on the main frame in a horizontal plane and also a free swinging movement in a vertical plane, said supporting-frame by its rotary movement presenting an edge of two sickle-sections to the grinding-wheel on opposite sides of the center of such wheel and means for limiting said rotary movement.

2. A sickle-grinder comprising a main frame, a rotatable grinding-wheel mounted therein, means for rotating said wheel, a sickle-bar-supporting frame having a swinging movement on the main frame and also rotatable on said main frame in a horizontal plane and means for adjusting and varying the amount of such rotation.

3. A sickle-grinder comprising a main frame, a rotatable grinding-wheel mounted therein, means for rotating said wheel, a sickle-bar-supporting frame formed in two sections between which the sickle-bar is held, one of such sections being pivotally connected to the main frame so as to have a freely-swinging movement in a vertical and horizontal plane and means for drawing and holding said sections together to grasp the bar.

4. A sickle-grinder comprising a main frame, a rotatable grinding-wheel mounted therein, means for rotating said wheel, a sickle-bar-supporting frame formed in two parts or sections between which the sickle-bar is held, and a cam device connected to one of said sections and bearing against the other section to draw said sections together to hold the interposed sickle-bar.

5. A sickle-grinder comprising a main frame, a rotatable grinding-wheel mounted therein, means for rotating said wheel, a movable base 11 having a partial rotation on the main frame, a sickle-bar-supporting frame pivotally mounted on said base and adapted to hold and present the work to the wheel.

6. A sickle-grinder comprising a main frame, a rotatable grinding-wheel, means for rotating said wheel, a movable base 11 having a partial rotation on the main frame, a sickle-bar-supporting frame formed in two sections, one section 15 being pivoted on said base and the other section 18 being normally loosely connected to the other section and having a projection extending through the section 15 and a cam 21 mounted on such projection and bearing against the section 15 to draw the sections together and hold an interposed sickle-bar.

7. A sickle-grinder comprising a main frame, sickle-grinding mechanism mounted therein, a movable base 11 having a partial movement on the frame and having lugs 12 depending along the sides of the frame, adjusting nuts or screws 13 in the lugs to limit the range of the movement of the base and a sickle-bar-supporting frame connected to said base.

8. A sickle-grinder comprising a main frame, sickle-grinding mechanism mounted therein, a movable base 11 mounted on the main frame and having lugs 12 depending along the sides of the frame, adjusting nuts or screws 13 in the lugs to limit the range of the movement of the base, and a sickle-bar-supporting frame having arms 16 pivotally mounted on said base.

9. A sickle-grinder comprising a main frame, a sickle-grinding mechanism mounted therein, a sickle-bar-supporting frame mounted on the main frame and mechanism for attaching the grinder to a stationary object comprising a depending hook 23 and a depending lug 24 on the bottom of the main frame, the lug having a screw-threaded hole, a screw-threaded rod or bolt 25 received by said hole and a hook 27 loosely mounted on said rod.

10. A sickle-grinder comprising a main frame, sickle-grinding mechanism mounted therein, a sickle-bar-supporting frame movably mounted on the main frame and comprising two sections 15 and 18, the section 15 having a plurality of arms or projections 17 having their free ends turned at right angles and the section 18 having arms or fingers 19 inturned and in close proximity to the said free ends and means for holding the two sections together to grasp the sickle-bar and knives therebetween.

JAMES MACPHAIL.

Witnesses:
SAMUEL E. HIBBEN,
ALLAN A. MURRAY.